United States Patent
Cao et al.

(10) Patent No.: US 11,537,928 B2
(45) Date of Patent: Dec. 27, 2022

(54) QUANTUM-CLASSICAL SYSTEM AND METHOD FOR MATRIX COMPUTATIONS

(71) Applicant: Zapata Computing, Inc., Boston, MA (US)

(72) Inventors: Yudong Cao, Cambridge, MA (US); Andrei Kniazev, Cambridge, MA (US)

(73) Assignee: Zapata Computing, Inc., Boston, MA (US)

( * ) Notice: Subject to any disclaimer, the term of this patent is extended or adjusted under 35 U.S.C. 154(b) by 372 days.

(21) Appl. No.: 16/864,998

(22) Filed: May 1, 2020

(65) Prior Publication Data

US 2020/0349459 A1 Nov. 5, 2020

Related U.S. Application Data

(60) Provisional application No. 62/843,199, filed on May 3, 2019.

(51) Int. Cl.
*G06N 10/00* (2022.01)
*G06F 17/11* (2006.01)
*G06F 17/16* (2006.01)

(52) U.S. Cl.
CPC ............ *G06N 10/00* (2019.01); *G06F 17/11* (2013.01); *G06F 17/16* (2013.01)

(58) Field of Classification Search
CPC ........ G06N 10/00; G06N 5/003; G06F 17/11; G06F 17/16
See application file for complete search history.

(56) References Cited

U.S. PATENT DOCUMENTS

| | | | |
|---|---|---|---|
| 7,590,607 | B2 | 9/2009 | Williams et al. |
| 7,877,333 | B2 | 1/2011 | Macready |
| 8,700,689 | B2 | 4/2014 | Macready |
| 8,832,164 | B2 | 9/2014 | Allen et al. |
| 8,832,165 | B2 | 9/2014 | Allen et al. |
| 8,897,449 | B1 | 11/2014 | Broadbent |
| 9,064,067 | B2 | 6/2015 | Wecker |
| 9,218,567 | B2 | 12/2015 | Macready |
| 9,477,796 | B2 | 10/2016 | Garcia-Ramirez et al. |

(Continued)

FOREIGN PATENT DOCUMENTS

| | | | |
|---|---|---|---|
| CN | 106611377 A | | 5/2017 |
| CN | 112789629 A | | 5/2021 |

(Continued)

OTHER PUBLICATIONS

International Search Report & Written Opinion dated Jun. 24, 2022, in international application No. PCT/US2022/021521, 8 pages.

(Continued)

*Primary Examiner* — Daniel D Chang
(74) *Attorney, Agent, or Firm* — Blueshift IP, LLC; Robert Plotkin

(57) ABSTRACT

A hybrid quantum-classical computer solves systems of equations and eigenvalue problems utilizing non-unitary transformations on the quantum computer. The method may be applied, for example, to principal component analysis, least squares fitting, regression, spectral embedding and clustering, vibrations in mechanics, fluids and quantum chemistry, material sciences, electromagnetism, signal processing, image segmentation and data mining.

12 Claims, 9 Drawing Sheets

(56) References Cited

U.S. PATENT DOCUMENTS

| | | | |
|---|---|---|---|
| 9,836,432 | B2 | 12/2017 | Ronagh |
| 10,242,321 | B2 | 3/2019 | Bocharov et al. |
| 10,275,717 | B2 | 4/2019 | Babbush et al. |
| 10,325,218 | B1 * | 6/2019 | Zeng ..................... G06N 10/00 |
| 10,572,816 | B1 | 2/2020 | Vavilov et al. |
| 10,666,462 | B2 | 5/2020 | Shin et al. |
| 10,776,709 | B2 | 9/2020 | Shin et al. |
| 10,846,366 | B1 | 11/2020 | Otterbach |
| 10,990,677 | B2 | 4/2021 | Wiebe et al. |
| 11,010,682 | B2 | 5/2021 | Bocharov et al. |
| 11,169,801 | B2 | 11/2021 | Cao |
| 11,244,240 | B2 | 2/2022 | Martinis et al. |
| 2005/0167658 | A1 | 8/2005 | Williams et al. |
| 2014/0297247 | A1 | 10/2014 | Troyer et al. |
| 2017/0147303 | A1 | 5/2017 | Amy |
| 2017/0255872 | A1 | 9/2017 | Hamze |
| 2017/0364796 | A1 | 12/2017 | Wiebe |
| 2018/0197102 | A1 | 7/2018 | Mohseni |
| 2019/0164059 | A1 | 5/2019 | Denchev et al. |
| 2019/0164079 | A1 | 5/2019 | Gambetta et al. |
| 2019/0244680 | A1 | 8/2019 | Rolfe et al. |
| 2019/0318053 | A1 | 10/2019 | Low et al. |
| 2019/0378032 | A1 * | 12/2019 | Kliuchnikov .......... G06N 10/00 |
| 2019/0394030 | A1 | 12/2019 | Forbes et al. |
| 2020/0057957 | A1 | 2/2020 | Johnson et al. |
| 2020/0104740 | A1 | 4/2020 | Cao |
| 2020/0118025 | A1 | 4/2020 | Romero et al. |
| 2020/0184278 | A1 | 6/2020 | Zadeh et al. |
| 2020/0202249 | A1 | 6/2020 | Hastings |
| 2020/0226197 | A1 | 7/2020 | Woerner et al. |
| 2020/0257987 | A1 | 8/2020 | McGeoch et al. |
| 2020/0293936 | A1 | 9/2020 | Granade et al. |
| 2020/0320159 | A1 | 10/2020 | Matthews |
| 2020/0327440 | A1 | 10/2020 | Cao |
| 2020/0327441 | A1 | 10/2020 | Cao et al. |
| 2020/0334107 | A1 | 10/2020 | Katabarwa |
| 2020/0394547 | A1 | 12/2020 | Cao |
| 2021/0011748 | A1 | 1/2021 | Lee et al. |
| 2021/0133618 | A1 | 5/2021 | Cao |
| 2021/0255856 | A1 | 8/2021 | Cao |

FOREIGN PATENT DOCUMENTS

| | | |
|---|---|---|
| EP | 3113084 A1 | 1/2017 |
| EP | 3837647 A1 | 6/2021 |
| WO | 2017066695 A1 | 4/2017 |
| WO | 2017152289 A1 | 9/2017 |
| WO | 2017156318 A1 | 9/2017 |
| WO | 2017189052 A1 | 11/2017 |
| WO | 2018064535 A1 | 4/2018 |
| WO | 2020037301 A1 | 2/2020 |
| WO | 2020072661 A1 | 4/2020 |
| WO | 2020142122 A2 | 7/2020 |
| WO | 2021092351 A1 | 5/2021 |

OTHER PUBLICATIONS

Marsh, S., and Wang, J.B., "Combinatorial optimization via highly efficient quantum walks," Physical Review Research, vol. 2, No. 2 023302 (2020), pp. 1-8 (Jun. 8, 2020).

Non-Final Office Action dated Jun. 24, 2022, in U.S. Appl. No. 16/844,011 of Yudong Cao, filed Apr. 9, 2020, 46 pages.

Non-Final Office Action dated Jun. 29, 2022, in U.S. Appl. No. 16/844,051 of Yudong Cao, filed Apr. 9, 2020, 38 pages.

Aaronson, S., "Quantum Machine Learning Algorithms: Read the Fine Print", Nature Physics, vol. 11, pp. 1-5 (2015).

Abrams, D. S., and Lloyd, S., et al., "A quantum algorithm providing exponential speed increase for finding eigenvalues and eigenvectors", arXiv:quant-ph/9807070v1, vol. 83, No. 24, pp. 1-9 (Jul. 24, 1998).

Airbus., "Airbus Quantum Computing Challenge: Bringing flight physics into the Quantum Era", <<https://www.airbus.com/innovation/ industry-4-0/quantum-technologies/airbus-quantum-computing-challenge.html>>, pp. 1-3, (Dec. 17, 2018).

Ambainis, A., "On physical problems that are slightly more difficult than QMA," In 2014 IEEE 29th Conference on Computational Complexity (CCC), pp. 1-12 (2014).

Aspuru-Guzik, A., et al., "Simulated Quantum Computation of Molecular Energies", Science, Quantum Physics, vol. 309, No. 5741, pp. 1-21 (Sep. 9, 2005).

Berry, D. W., "High-order quantum algorithm for solving linear differential equations", Journal of Physics A: Mathematical and Theoretical, arXiv:1010.2745v2, vol. 47, No. 10, pp. 1-14 (Jan. 28, 2014).

Berry, D. W., et al., "Quantum algorithm for linear differential equations with exponentially improved dependence on precision", arXiv:1701.03684v2, pp. 1-20 (Feb. 17, 2017).

Bravo-Prieto, C., et al., "Variational Quantum Linear Solver," Quantum Physics, arXiv:1909.05820, pp. 1-21 (Sep. 12, 2019).

Cao, Y., et al., "Quantum algorithm and circuit design solving the Poisson equation," New Journal of Physics, vol. 15, pp. 1-29 (Jan. 2013).

Cao, Y., et al., "Quantum Chemistry in the Age of Quantum Computing", Quantum Physics, arXiv:1812.09976v2, pp. 1-194 (Dec. 28, 2018).

Chamorro-Posada, P., and Garcia-Escartin, J. C., "The SWITCH test for discriminating quantum evolutions", Quantum Physics, pp. 1-5 (2017).

Christopher J. C. Burges, "Factoring as Optimization," Microsoft Research, Microsoft Corporation, Tech. Rep. MSR-TR-2002-83, 19 pages (2002).

Clader, B. D., et al., "Preconditioned quantum linear system algorithm", Phys. Rev. Lett., arXiv:1301.2340v4, vol. 110, No. 25, pp. 1-5 (May 7, 2013).

Dash, A., et al., "Exact Search Algorithm to Factorize Large Biprimes and a Triprime on IBM Quantum Computer", pp. 1-13 (Jul. 2018).

Eric R. Anschuetz et al. "Variational Quantum Factoring," arXiv:1808.08927vl. Aug. 27, 2018 [retrieved on Nov. 25, 2019]. Retrieved from <https://arxiv .org/pdf/ 1808.08927.pdf>.

Evgeny Dantsin et al., "A deterministic (2−2/(k+1))n algorithm for k-SAT based on local search," Theoretical Computer Science 289, pp. 69-83 (2002).

Farhi, E., et al., "A quantum approximate optimization algorithm", Quantum Physics, arXiv:1411.4028v1, pp. 1-16, (Nov. 14, 2014).

Final Office Action dated Apr. 13, 2021, in U.S. Appl. No. 16/543,478 of Yudong Cao, filed Aug. 16, 2019, 25 pages.

G. E. Hinton et al., "Reducing the Dimensionality of Data with Neural Networks," SCIENCE, vol. 313, Jul. 28, 2006, pp. 504-508. Available online at https://www.cs.toronto.edu/~hinton/science.pdf.

Gilyén, A., et al., "Quantum Singular Value Transformation and Beyond: Exponential Improvements for Quantum Matrix Arithmetics," In Proceedings of the 51st Annual ACM SIGACT Symposium on Theory of Computing, pp. 193-204, 2019. arXiv:1806.01838, Jun. 5, 2018, 67 pages.

Gómez-Bombarelli, R., et al., "Automatic Chemical Design Using a Data-Driven Continuous Representation of Molecules", ACS Cent. Sci., vol. 4, No. 2, pp. 268-276 (2018).

Gonthier, J., et al., "Identifying challenges towards practical quantum advantage through resource estimation: the measurement roadblock in the variational quantum eigensolver," Quantum Physics, arXiv:2012.04001, pp. 1-27 (Dec. 7, 2020).

Harrow, A. W., et al., "Quantum algorithm for linear systems of equations", Phys. Rev. Lett., vol. 103, No. 15, 1-15 (2009).

Huang, H., et al., "Near-term quantum algorithms for linear systems of equations," arXiv preprint arXiv:1909.07344, pp. 1-22 (Dec. 16, 2019).

International Search Report & Written Opinion dated Feb. 26, 2021, in international patent application No. PCT/US2020/059371, 8 pages.

International Search Report and Written Opinion dated Dec. 4, 2019 in PCT Application No. PCT/US2019/046966, 8 pages.

International Search Report and Written Opinion dated Jan. 29, 2020, in International Patent Application No. PCT/US2019/054316, 8 pages.

(56) References Cited

OTHER PUBLICATIONS

Jarrod R McClean et al., "The theory of variational hybrid quantum-classical algorithms," New Journal of Physics, 18(2):023023, 2016. arXiv:1509.04279, Sep. 14, 2015, 20 pages.
Kandala, A., et al., "Hardware-efficient Variational Quantum Eigensolver for Small Molecules and Quantum Magnets," Nature 549, arXiv:1704. 05018v2, pp. 1-24 (2017).
Lin, L, and Tong, Y., "Near-optimal ground state preparation," Quantum, 4:372, arXiv:2002.12508, pp. 1-22 (Dec. 6, 2020).
Matlab "Global Optimization Toolbox," The MathWorks, Inc., Copyright 1994-2021. 12 pages. Accessible at https://www.mathworks.com/products/global-optimization.html.
Nanyang Xu et al., "Quantum Factorization of 143 on a Dipolar-Coupling Nuclear Magnetic Resonance System," Phys. Rev. Lett. 108, 130501, Mar. 30, 2012, 5 pages, arXiv:1111.3726.
Nielsen, M. A., and Chuang, I. L., "Quantum Computation and Quantum Information", Cambridge University Press, pp. 1-704 (2000).
Nikesh S. Dattani et al., "Quantum factorization of 56153 with only 4 qubits," (2014), 6 pages, arXiv:1411.6758.
Nikolaj Moll et al, "Quantum optimization using variational algorithms on near-term quantum devices," Quantum Science and Techno logy vol. 3, Jun. 19, 2018 [retrieved on Nov. 25, 2019]. Retrieved from <https://iopscience.iop.org/article/10.1088/2058-9565/aab822/pdf>.
Non-Final Office Action dated Dec. 7, 2020, in U.S. Appl. No. 16/543,478 of Yudong Cao, filed Aug. 16, 2019, 33 pages.
Non-Final Office Action dated Sep. 3, 2021, in U.S. Appl. No. 16/543,478 of Yudong Cao, filed Aug. 16, 2019, 27 pages.
O'Malley, P. J. J., et al., "Scalable quantum simulation of molecular energies", Physical Review X, vol. 6, No. 3, pp. 031007-1-031007-13, (2016).
Otterbach et al., U.S. Appl. No. 16/217,410 Specification, Provisional for U.S. Appl. No. 16/217,410, now U.S. Pat. No. 10,846,366, filed Dec. 2017. (Year: 2017).
Peter W. Shor, "Polynomial-Time Algorithms for Prime Factorization and Discrete Logarithms on a Quantum Computer," SIAM J.Sci.Statist.Comput. 26, 28 pages, (1997) 1484, arXiv:9508027.
Preskill, J., "Quantum Computing in the NISQ era and beyond", arXiv preprint arXiv:1801.00862v3, pp. 1-20 (Jul. 31, 2018).
Raouf Dridi et al., "Prime Factorization Using Quantum Annealing and Computational Algebraic Geometry," Nature Scientific Reports 7, Article No. 43048 (2017), 17 pages, arXiv:1604.05796.
Rebentrost, P., et al., "Quantum support vector machine for big data classification", Physical Review Letters, arXiv:1307.0471v3, vol. 113, No. 3, pp. 1-5 (Jul. 10, 2014).
Rice, J.E., et al., "Quantum computation of dominant products in lithium-sulfur batteries," The Journal of Chemical Physics, 154(13):134115, 2021. arxiv2001.01120, pp. 1-7 (Jan. 4, 2020).
Robin A. Moser et al., "A full derandomization of Schöning's k-SAT algorithm," Proceedings of the 43rd Annual ACM Symposium on Theory of Computing—STOC '11 (ACM Press, New York, New York, USA, 2011) pp. 245-251.
Rolando D Somma et al., "Spectral gap amplification," SIAM Journal on Computing, 42(2):593-610, 2013. arXiv:1110.2494, Mar. 30, 2012, 14 pages.
Rolando D Somma, "Quantum eigenvalue estimation via time series analysis," New Journal of Physics, 21(12):123025, 2019. arXiv:1907. 11748, Jul. 26, 2019, 10 pages.
Romero, J., et al., "Strategies for quantum computing molecular energies using the unitary coupled cluster ansatz", arXiv:1701. 02691v2 [quant-ph], vol. 4, No. 4, pp. 1-18 (Feb. 10, 2018).
Sam McArdle et al., "Digital quantum simulation of molecular vibrations," Chemical science, 10(22):5725-5735, 2019. arXiv:1811. 04069, Nov. 9, 2018, 14 pages.
Seeley, J.T., et al., "The Bravyi-Kitaev transformation for quantum computation of electronic structure," The Journal of chemical physics, 137(22):224109, 2012. arXiv:1208.5986, pp. 1-38 (Aug. 29, 2012).

Sevag Gharibian et al., "Oracle Complexity Classes and Local Measurements on Physical Hamiltonians," In 37th International Symposium on Theoretical Aspects of Computer Science (STACS 2020). Schloss Dagstuhl-Leibniz-Zentrum für Informatik, 2020. arXiv:1909.05981, Sep. 12, 2019, 38 pages.
Sevag Gharibian et al., "The complexity of simulating local measurements on quantum systems," Quantum, 3:189, 2019. arXiv:1606. 05626, Apr. 7, 2020, 38 pages.
Shantanav Chakraborty et al., "The Power of Blockencoded Matrix Powers: Improved Regression Techniques Via Faster Hamiltonian Simulation," arXiv preprint arXiv:1804.01973, Sep. 3, 2018, 58 pages.
Shen, Y., et al., "Quantum implementation of unitary coupled cluster for simulating molecular electronic structure", arXiv:1506. 00443v2, vol. 95, No. 2, pp. 1-6 (2015).
Szabo, A. and Ostlund, N.S., "Modern quantum chemistry: introduction to advanced electronic structure theory," Courier Corporation, 2012. pp. 1-479 (2012).
TensorFlow, "TensorFlow Core: Tutorial," 39 pages, Last updated May 20, 2021 UTC. Accessible at https://www.tensorflow.org/tutorials/.
Thomas E O'Brien et al., "Calculating energy derivatives for quantum chemistry on a quantum computer," NPJ Quantum Information, 5(1):1-12, 2019.
Vedran Dunjko et al., "Computational Speedups Using Small Quantum Devices," (2018), 18 pages, arXiv:1807.08970.
Wang, G., et al., "Minimizing Estimation Runtime on Noisy Quantum Computers," PRX Quantum 2.1 pp. 010346-1-010346-49 (2021).
Watson, J.D., et al., "The complexity of translationally invariant problems beyond ground state energies", arXiv preprint arXiv:2012. 12717, pp. 1-58 (Dec. 23, 2020).
Whitfield, J. D., et al., "Simulation of electronic structure Hamiltonians using quantum computers", Molecular Physics, arXiv:1001.3855v3, vol. 109, No. 5, pp. 1-22 (2011).
Wiebe, N., et al., "Quantum Data Fitting", Phys. Rev. Lett., arXiv:1204. 5242v2, pp. 1-6 (Jul. 3, 2012).
Yigal Meir et al., "Landauer formula for the current through an interacting electron region," Physical review letters, 68(16):2512, 1992, 5 pages.
Yigit Subasi et al., "Quantum algorithms for systems of linear equations inspired by adiabatic quantum computing," Physical review letters, 122(6):060504, 2019. arXiv:1805.10549, May 26, 2018, 9 pages.
Yimin Ge et al., "Faster Ground State Preparation and High-Precision Ground Energy Estimation with Fewer Qubits," Journal of Mathematical Physics, 60(2):022202, 2019. arXiv:1712.03193, Feb. 2, 2018, 25 pages.
Yosi Atia et al., "Fast-Forwarding of Hamiltonians and Exponentially Precise Measurements," Nature communications, 8(1) pp. 1-9, Nov. 17, 2017.
Yudong Cao et al., "Potential of Quantum Computing for Drug Discovery," IBM Journal of Research and Development, vol. 62, Issue 6, pp. 6:1-6:20, Nov./Dec. 2018.
Gingrich, R. M., and Williams, C. P., "Non-unitary probabilistic quantum computing", ACM, pp. 1-6 (Sep. 15, 2003).
Notice of Allowance dated Jun. 9, 2021 for U.S. Appl. No. 17/272,189 of Yudong Cao, filed Feb. 26, 2021, 16 pages.
Anschuetz, E., et al., "Variational Quantum Factoring," Feb. 19, 2019, Advances in Databases and Information Systems; [Lecture Notes in Computer Science; Lect.Notes Computer], Springer International Publishing, Cham, pp. 74-85, XP047505564, ISBN: 978-3-319-10403-4.
Extended European Search Report dated Apr. 25, 2022, in European patent application No. 19850464.9, 11 pages.
Moll, N., et al., "Quantum optimization using variational algorithms on near-term quantum devices," Arxiv.org, Cornell University Library, 201 Olin Library Cornell University Ithaca, NY 14853, pp. 1-30 (Oct. 3, 2017), XP081147319, DOI: 10.1088/2058-9565/AAB822.
Wang, Z., et al., "The Quantum Approximation Optimization Algorithm for MaxCut: A Fermionic View," Arxiv.org, Cornell University, 201 Olin Library Cornell University Ithaca, NY 14853, pp. 1-13 (Jun. 9, 2017), XP081277838, DOI: 10.1103/PHYSREVA.97. 022304.

(56) References Cited

OTHER PUBLICATIONS

Berry, D.W. et al., "Simulating Hamiltonian Dynamics with a Truncated Taylor Series", Phys. Rev. Lett., vol. 114, 090502 pp. 1-5 (Mar. 3, 2015).
Brassard, G., et al., "Quantum Amplitude Amplification and Estimation", book Quantum Computation and Information, Samuel J. Lomonaco, Jr. and Howard E. Brandt, Editors, AMS Contemporary Mathematics, No. 305, pp. 1-22 (2002).
Bravyi, L.D., and Kitaev, A.Y., "Fermionic Quantum Computation", Annals of Physics, vol. 298, No. 1, pp. 210-226 (2002).
Buhrman, H., et al., "Quantum fingerprinting", Physical Review Letters, vol. 87, No. 16, pp. 1-8, (2001).
Cao, "Hybrid quantum-classical algorithm for variational coupled cluster method", APS March Meeting 2019, vol. 64, No. 2, Monday-Friday, pp. 1-8, Mar. 4-8, 2019; Boston, Massachusetts.
Childs, A.M. and Wiebe, N., "Hamiltonian simulation using linear combinations of unitary operations", Quantum Information and Computation, vol. 12, pp. 901-924 (2012).
Childs, A.M. et al., "Quantum algorithm for systems of linear equations with exponentially improved dependence on precision", SIAM Journal on Computing vol. 46, No. 6, pp. 1-31, (2017).
Evangelista, F.A., "Alternative single-reference coupled cluster approaches for multireference problems: The simpler, the better", Journal of Chemical Physics, vol. 134, No. 22, pp. 1-13 (2011).
Grover, L.K., "A fast quantum mechanical algorithm for database search", 28th Annual ACM Symposium on the Theory of Computing, pp. 1-8, (1996).
Grover, L.K., "A different kind of quantum search", Quantum Physics, pp. 1-13 (2005).
Guerreschi, G.G., "Repeat-Until-Success circuits with fixed-point oblivious amplitude amplification", Phys. Rev. A 99, 022306 pp. 1-13, (2018).
Harsha, G., et al., "On the difference between variational and unitary coupled cluster theories", J. Chem. Phys. vol. 148, 044107, pp. 1-6 (2018).
Helgaker T. et al., "Molecular Electronic-Structure Theory", Book published by John Wiley & Sons, pp. 1-908 (2000).
International Search Report & Written Opinion dated Jul. 30, 2020, in international patent application No. PCT/US2019/054795, 8 pages.
Kothari, R., "Efficient algorithms in quantum query complexity", PhD thesis, University of Waterloo, pp. 1-128, 2014.
McClean, J.R., et al., "Barren plateaus in quantum neural network training landscapes", Nature Communications, vol. 9, pp. 1-6, 2018.
McClean, J.R., et al., "The theory of variational hybrid quantum-classical algorithms", New Journal of Physics, vol. 18, pp. 1-22 (Feb. 5, 2016).
Nielsen, M., "The Fermionic canonical commutation relations and the Jordan-Wigner transform", michaelnielsen.org, pp. 1-8, 2005.
Peruzzo, A., et al., "A variational eigenvalue solver on a photonic quantum processor", Nature Communications, vol. 5, 4213, pp. 1-7, 2014.
Preskill, J., "Quantum Computing in the NISQ era and beyond", pp. 1-20, Jul. 31, 2018.
Schuch, N., et al., "Computational Complexity of interacting electrons and fundamental limitations of Density Functional Theory", Nature Physics, | DOI: 10.1038/NPHYS1370, pp. 732-735, Aug. 23, 2009.
Setia, K., et al., "Bravyi-Kitaev Superfast simulation of fermions on a quantum computer", arXiv:1712.00446v3 pp. 1-13, 2017.
Terashima, H., et al., "Nonunitary quantum circuit", International Journal of Quantum Information, vol. 3, No. 4, pp. 1-19, Apr. 6, 2005.
Theodore J.Y., et al., "Fixed-point quantum search with an optimal number of queries", Physical Review Letters, Issue No. 113, vol. 21, pp. 210501-210505, Nov. 2014.
Voorhis T.V., et al., "Benchmark variational coupled cluster doubles results", Journal of Chemical Physics, Vo. 113, No. 20, 8873-8879, 2000 (Abstract).
Yamada, S., et al., "High Performance LOBPCG Method for Solving Multiple Eigenvalues of Hubbard Model: Efficiency of Communication Avoiding Neumann Expansion Preconditione", In: Yokota R., Wu W. (eds) Supercomputing Frontiers. SCFA 2018. Lecture Notes in Computer Science, vol. 10776. Springer, Cham, pp. 243-256.
Zujev, A., "Note on Non-Unitary Quantum Gates in Quantum Computing", Working Paper, University of California, Davis, DOI: 10.13140/RG.2.2.30712.85767, pp. 1-3, 2017.

* cited by examiner

QUANTUM-CLASSICAL SYSTEM AND METHOD FOR MATRIX COMPUTATIONS

BACKGROUND

Quantum computers promise to solve industry-critical problems which are otherwise unsolvable or only very inefficiently addressable using classical computers. Key application areas include chemistry and materials, bioscience and bioinformatics, logistics, and finance. Interest in quantum computing has recently surged, in part due to a wave of advances in the performance of ready-to-use quantum computers.

Systems exist for using classical computers, quantum computers, and hybrid quantum-classical (HQC) computers to solve systems of equations and eigenvalue problems. For many such problems, exactly solving the problem is intractable in general due to the exponential growth of the state space.

What is needed, therefore, are improved techniques for solving systems of equations and eigenvalue problems.

SUMMARY

A hybrid quantum-classical computer solves systems of equations and eigenvalue problems utilizing non-unitary transformations on the quantum computer. The method may be applied, for example, to principal component analysis, least squares fitting, regression, spectral embedding and clustering, vibrations in mechanics, fluids and quantum chemistry, material sciences, electromagnetism, signal processing, image segmentation and data mining.

Other features and advantages of various aspects and embodiments of the present invention will become apparent from the following description and from the claims.

DETAILED DESCRIPTION

Figure 1:
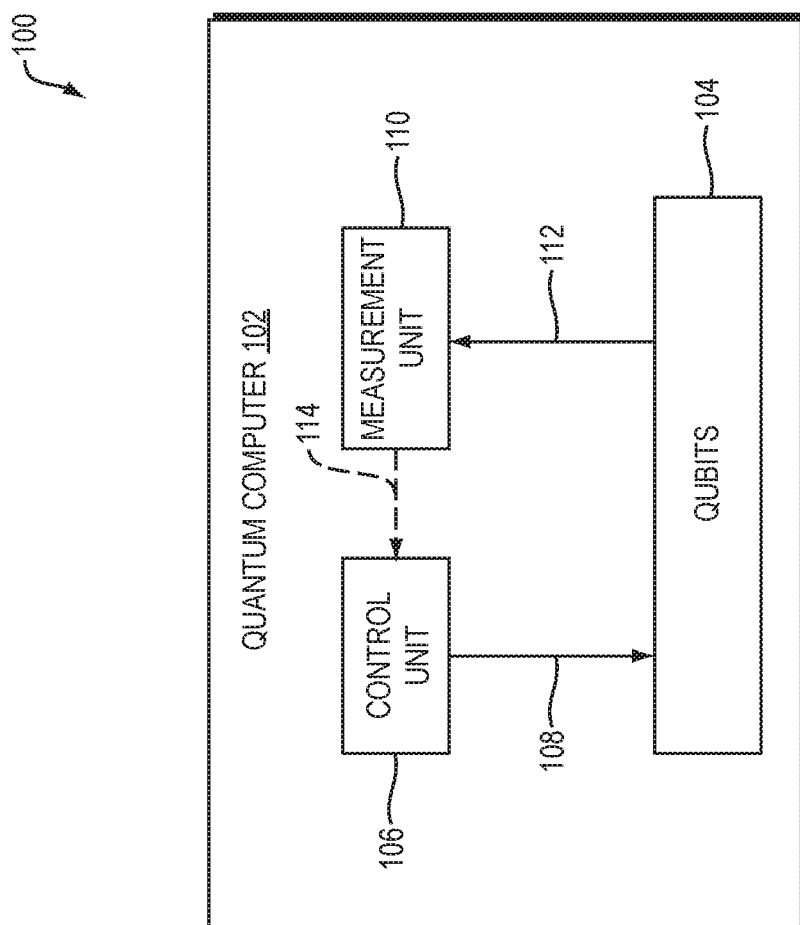
FIG. 1 is a diagram of a quantum computer according to one embodiment of the present invention.

Embodiments of the present invention are directed to a quantum computing device and method for finding the lowest eigenvector of a Hermitian matrix A. Embodiments of the present invention include preparing a quantum state corresponding to a candidate solution vector and applying an operation to the state. The transformed state is an updated candidate solution. The operation process is then repeated, with the new candidate solution replacing the old, until a final state has been obtained that encodes the lowest eigenvector of A. The final state is then measured, and the eigenvector obtained.

Some embodiments include a classical computing component, which computes the first candidate solution vector. In some embodiments, the classical computing component computes the operation for transforming the candidate solution.

A hybrid quantum-classical computer solves systems of equations and eigenvalue problems utilizing non-unitary transformations on the quantum computer. The method may be applied, for example, to principal component analysis, least squares fitting, regression, spectral embedding and clustering, vibrations in mechanics, fluids and quantum chemistry, material sciences, electromagnetism, signal processing, image segmentation and data mining.

Certain embodiments of the present invention use Chebyshev polynomials in their two- or three-term recurrence form. The advantages of Chebyshev polynomial based methods is the absence of the need for computing scalar products since the roots of the Chebyshev polynomials are known analytically. A disadvantage is that the interval in which the desired eigenvalues dwell needs to be provided beforehand.

Introduction. Many problems of interest involve finding the lowest eigenvalue and eigenvector (or eigenspace) of a Hermitian operator A. This amounts to finding the vector x (or a space of vectors) that minimizes the Rayleigh quotient $$\rho(x) = \frac{x^\dagger A x}{x^\dagger x}.$$

In the case of problems in quantum physics, one often seeks the ground state $|\Psi\rangle$ of a Hamiltonian H. Here $|\Psi\rangle$ is a unit complex vector and H is a Hermitian matrix. Hence the ground state problem can be stated as $$\min_\psi \rho(\psi) = \langle \psi | H | \psi \rangle. \tag{1}$$

For quantum mechanical systems, exactly solving the problem in Equation 1 is intractable in general due to the exponential growth of the state space, making it unrealistic to even store the full wavefunction $|\Psi\rangle$, not to mention extracting the ground state of the Hamiltonian. As an example, a recent numerical study aimed at solving the ground state of Hubbard model on a 2D 4×5 grid restricted to a specific subspace has exhausted the memory of the entire K computer. The dominant cost of the numerical calculation comes from storing the trial wavefunctions and performing matrix-vector multiplications.

Quantum computers, on the other hand, can sidestep the limitations in storing full wavefunctions and performing matrix-vector multiplications in ways that are beyond classical computation. More importantly, if the Hamiltonian H admits a succinct description or its entries are accessible by specific quantum mechanical oracles (see description below for more details), then one can efficiently measure the energy (or the Rayleigh quotient) $\rho(\Psi)$ on a quantum computer that can generate the state $\Psi$. A representative example of how quantum computers can take advantage of these unique abilities is the recently proposed scheme of variational quantum eigensolver (VQE). The basic idea is that instead of the original problem in (1), one solves the proxy problem $$\min_\theta \langle 0|U(\theta)^\dagger H U(\theta)|0\rangle \qquad (2)$$

where $\theta$ is a set of classically controllable parameters for the quantum computer to apply the unitary operation $U(\theta)$ onto a fixed initial state $|\Psi\rangle$ to generate the trial state $|\Psi(\theta)\rangle = U(\theta)|0\rangle$ on its qubits. One could then proceed to iteratively tune the classical parameters and measure the corresponding energy function on the quantum computer, until the energy is sufficiently low to qualify $|\Psi(\theta)\rangle$ as an approximation of the ground state.

The method of VQE is appealing because it allows one to take full advantage of the current quantum computers, which are noisy intermediate scale quantum (NISQ) devices. However, in general it is difficult to predict how many iterations are needed for a VQE scheme to converge, since this is dependent on the entire setting of (2): the functional form of $\Psi(\theta)$, initial guesses for $\theta$ and the optimization method used. In particular, it has been shown that in many cases starting from a random initial guess will likely lead to a local gradient which is vanishingly small as the size of the problem grows.

Iterative scheme for linear systems and least squares. The problems of linear systems and linear least squares problems entail minimization of a quadratic form involving a Hermitian positive definite matrix A and a vector $\vec{b}$. Minimization of the objective function $$\min_x f(\vec{x}) = \frac{1}{2}\vec{x}^\dagger A\vec{x} - \vec{b}^\dagger \vec{x}. \qquad (3)$$

results in the solution to the linear system $A\vec{x} = \vec{b}$ for A being an Hermitian positive definite matrix. In the case where A is not Hermitian positive definite, the objective function becomes instead $$\min_x \frac{1}{2}\vec{x}^\dagger A^\dagger A\vec{x} - \vec{b}^\dagger A\vec{x} \qquad (4)$$

in the least squares method, resulting in the solution to the linear system $A^\dagger A\vec{x} = A^\dagger \vec{b}$ where A is non-singular.

There are two common methods for iteratively solving problems in Equations 3 and 4, namely steepest gradient descent and Chebyshev polynomial iteration. The following describes an example of a first steepest descent algorithm for linear systems and linear least squares, formulated as a Ritz projection method, described in the following pseudo-code, referred to herein as "Algorithm 1":

---

Data: Hermitian positive definite matrix A and vector $\vec{b}$;
Result: Approximate solution $\vec{x}$ to $A\vec{x} = \vec{b}$.
1. Start from an initial guess $\vec{x}_0$ (can be random)
2. for k = 0, 1, 2, . . . do
    3. Compute $\vec{r}_k = A\vec{x}_k - \vec{b}$ ;
    4. Choose $\alpha$ such that $f(\vec{x}_k + \alpha \vec{r}_k)$ in (3) is minimized. This step can be performed
    analytically : $\alpha = \dfrac{\vec{r}_k^\dagger \vec{r}_k}{\vec{r}_k^\dagger A \vec{r}_k}$;
    5. Compute $\vec{x}_{k+1} = \vec{x}_k + \alpha \vec{r}_k$;
6. end

---

The following pseudo-code, referred to herein as "Algorithm 2," describes an example of a second steepest descent algorithm for linear systems and linear least squares, which uses an iterative quantum-classical scheme for linear systems inspired by steepest descent:

Data: Hermitian positive definite matrix A, upper bound $\gamma$ such that $\|A\|_2 \leq \gamma$ and a quantum state $|b\rangle$;
Result: A state $|v\rangle$ approximating the normalized solution $\dfrac{1}{\|A^{-1}|b\rangle\|} A^{-1}|b\rangle$.

1. Start from initial state $|v_0\rangle$ (can be a randomly generated state);
2. Let $\tilde{A} = \dfrac{1}{\gamma} A$.

Then $\|\tilde{A}\|_{\max \leq \|\tilde{A}\|_2 \leq 1}$,
satisfying criterion 8
listed previously for using techniques disclosed,
for example, in Andrew M. Childs, Robin Kothari, and
Rolando D. Somma, "Quantum algorithm for systems of
linear equations with exponentially improved
dependence on precision," SIAM Journal on Computing,
46 (6) :1920-1950, January 2017;

3. Generate the normalized residual
$$|r_0\rangle = \frac{1}{\|\tilde{A}|v_0\rangle - |b\rangle\|} \left(\tilde{A}|v_0\rangle - |b\rangle\right)$$
and the norm $\|\tilde{A}|v_0\rangle - |b\rangle\|$;
4. Let $R_0 = I$ be the first operator in a sequence of operators $R_i$ with each i labelling one iteration;

5. for k = 0, 1, 2, . . . do
   6. Prepare copies of the state $$|r_k\rangle = \frac{1}{\|R_k \ldots R_1 R_0 |r_0\rangle\|} R_k R_{k-1} \ldots R_1 R_0 |r_0\rangle$$

where each $R_i$ is a non-
   unitary operator that can be realized using the
   procedure described in the section herein
   entitled, "Realizing the non-unitary operator
   $I + \alpha \tilde{A}$."
   7. Estimate the norm $N_k = \|R_k \ldots R_1 R_0 |r_0\rangle\|_2$
   8. Compute $$\alpha = \frac{1}{\langle r_k | \tilde{A} | r_k \rangle};$$

9. Let $R_{k+1} = (I - \alpha \tilde{A})$ where $\alpha$ depends on k;
10. End
11. Suppose the algorithm terminates at iteration n.
   Then $$|v_n\rangle = \frac{1}{\left\| |v_0\rangle - \sum_{k=1}^{n} \alpha_k N_k |r_k\rangle \right\|} \left( |v_0\rangle - \sum_{k=1}^{n} \alpha_k N_k \frac{R_k \ldots R_1 R_0 |r_0\rangle}{\|R_k \ldots R_1 R_0 |r_0\rangle\|_2} \right)$$

is the approximate lowest eigenvector of A
(normalized to 1) and $\langle v | \tilde{A} | v \rangle$ is the approximate
eigenvalue.

---

The following pseudo-code, referred to herein as "Algorithm 3," describes an example of an iterative quantum-classical scheme for linear systems inspired by the Chebyshev polynomial:

Data: Hermitian positive definite matrix A and
upper bound $\gamma$ such that $A \leq \gamma I$;
A bound $\delta$ such that $0 < \delta < \gamma$;
A quantum state $|b\rangle$ which can be generated via a
unitary operation $U_b$ such that $|b\rangle = U_b |0\rangle$;
Result: A state $|v\rangle$ approximating the normalized
solution of the linear system $\frac{A^{-1}|b\rangle}{\|A^{-1}|b\rangle\|_2}$.

1. Start from initial state $|v_0\rangle$ (can be a randomly
   generated state) ;
2. Let $\tilde{A} = \frac{1}{\gamma} A$.
   Then $\|\tilde{A}\|_{max} \leq \|\tilde{A}\|_2 \leq 1$, satisfying criterion
   3 listed previously for using techniques in Childs,
   et al., cited above;
3. Let $R_0 = I$ be the first operator in a sequence of
   operators $R_i$ with each i labelling one iteration;
4. Determine the n-th order Chebyshev polynomial of the
   first type on the interval $[\delta/\gamma, 1]$;
5. for k = 0, 1, 2, . . . , n do
   6. Prepare copies of the state $$|v_k\rangle = \frac{R_k R_{k-1} \ldots R_1 R_0 |v_0\rangle}{\|R_k \ldots R_1 R_0 |v_0\rangle\|}$$

where each $R_i$ is a non-unitary operator that
   can be realized using the procedure described
   in the section herein entitled, "Realizing the
   non-unitary operator $I + \alpha \tilde{A}$ . " ;
   7. Let $R_{k+1} = (I + \alpha_k \tilde{A})$ where $\frac{1}{\alpha_k}$
   is the k-th zero of
   the Chebyshev polynomial of the first type on
   the interval $\left[\frac{\delta}{\gamma}, 1\right]$
8. end
9. Then $$|v_n\rangle = \frac{R_n R_{n-1} \ldots R_1 R_0 |v_0\rangle}{\|R_n \ldots R_1 R_0 |v_0\rangle\|_2}$$

is the approximate lowest
   eigenvector of A (normalized to 1) and
   $\langle v | \tilde{A} | v \rangle$ is the approximate eigenvalue.

3. Iterative scheme for eigenvalue problems. An embodiment of the present invention which includes an algorithm for using hybrid quantum-classical computers to find the lowest eigenvalue and a quantum representation of the lowest eigenvector of a Hermitian matrix with random initial guesses and empirically strong convergence properties will now be described. For a matrix of condition number K, this embodiments finds a quantum state representation of its lowest eigenvector up to error $\epsilon$ within time[1] $\tilde{O}(\sim \kappa^4/\epsilon^2)$. Like VQE, this embodiment is also hybrid quantum-classical. However, in the case of this embodiment there is strong convergence properties for arbitrary initial guesses that are supported by empirical observation, while VQE relies mostly on parametrized unitary operations that may suffer from the problem of "barren plateau" for random initial guesses. A crucial feature of the present invention, which is distinguishable from VQE, is that in the present embodiment the algorithm relies on systematically improving a sequence of non-unitary operations.

[1] This embodiment uses O(·) as the usual big-O notation for asymptotic scaling. The notation Õ(·) refers to asymptotic scaling that ignores the slow growing factors such as log and loglog etc. The symbol ~ inside the parentheses stands for empirical scaling.

Compared with classical methods, in the concrete case of a Hamiltonian acting on n qubits, finding the ground state up to error $\epsilon$ takes $$O\left(2^n \log \frac{1}{\epsilon}\right)$$

time on a classical computer. However, for most physical systems $\kappa$=tpoly(n). Hence quantum algorithm implemented according to embodiments of the present invention yield a significant speedup over classical ones for treating large systems. This could prove useful particularly in the treatment of large quantum systems, such as the case disclosed in Susumu Yamada, Toshiyuki Imamura, and Masahiko Machida, "High performance LOBPCG method for solving multiple eigenvalues of Hubbard model: Efficiency of communication avoiding Neumann expansion preconditioner," in Supercomputing Frontiers, pages 243-256, Cham, 2018, Springer International Publishing, where even representing the state of the physical system becomes prohibitively costly.

This embodiment combines the advantages of quantum computers and classical algorithms for eigenvalue problems by using quantum computers to maintain and update the current trial solution vector, while the operations performed on a quantum computer are inspired by locally optimal classical iterative methods based on Rayleigh-Ritz subspace and its variants. More specifically, this embodiment uses the recently developed techniques for realizing non-unitary operations efficiently on a quantum computer to accomplish the iterations.

The classical steepest descent method for estimating the lowest eigenpair of a matrix A works by starting from some solution $\vec{x}_0$ and iteratively updating the candidate solution by $$\vec{x}_{k+1} = \vec{x}_k + \alpha \vec{w}_k \quad (5)$$

where $\vec{w}_k$ is a search direction for the k-th step and $\alpha$ is a scalar. A typical choice for the search direction is $\vec{w}_k = \mathcal{F}(A) \vec{x}_k$ where $\mathcal{F}$ is a function of A. It is more beneficial to do $\vec{w}_k = \mathcal{T}_p(A) \vec{x}_k$ where $\mathcal{T}_p$ being the p-th order first-kind Chebyshev polynomial because the evaluation of $\mathcal{T}_p$ does not depend on the scalar $\alpha$. This also reduces the number of iterations needed compared with the case p=1. For any fixed p the error can bounded (sharply) from above by $$\left(\mathcal{T}_p\left(\frac{1-\xi}{1+\xi}\right)\right)^{-k} \approx \left(1 - \frac{1}{\sqrt{\xi}}\right)^{pk},$$

which is an asymptotic lower bound for large p. The value of $\alpha$ is chosen such that $$\vec{y} = \begin{pmatrix} 1 \\ \alpha \end{pmatrix}$$

is the lower eigenvector in the generalized eigenvalue problem $$M\vec{y} = \lambda S \vec{y}, \quad (6)$$

where the matrix M and the matrix S (called overlap matrix) are formed by $$M = \begin{pmatrix} \vec{x}^\dagger A \vec{x} & \vec{x}^\dagger A \vec{w} \\ \vec{w}^\dagger A \vec{x} & \vec{w}^\dagger A \vec{w} \end{pmatrix}, S = \begin{pmatrix} \vec{x}^\dagger \vec{x} & \vec{x}^\dagger \vec{w} \\ \vec{w}^\dagger \vec{x} & \vec{w}^\dagger \vec{w} \end{pmatrix}. \quad (7)$$

If A is positive definite and Hermitian, achieving the error $\epsilon$ in the steepest descent method takes $$O\left(\log \frac{1}{\epsilon}\right)$$

iterations. Here we summarize the steps in Algorithm 4.

The following pseudo-code, referred to herein as "Algorithm 4," is a description of a steepest descent algorithm formulated as a Rayleigh-Ritz subspace projection method according to one embodiment of the present invention:

---

Data: Hermitian positive definite matrix A;
Result: Approximate solution $\vec{x}$ to the smallest eigenvector of the matrix A.
1. Start from an initial guess $\vec{x}_0$ (can be random).
2. for k = 0, 1, 2, ... do
 3. Compute $\vec{w}_k = A\vec{x}_k$;
 4. Solve for $\vec{y} = \begin{pmatrix} 1 \\ \alpha \end{pmatrix}$ corresponding to the smaller eigenvalue in (6);
 5. Compute $\vec{x}_{k+1} = \vec{x}_k + \alpha \vec{w}_k$;
6. end

---

The above scheme then translates to a hybrid quantum-classical algorithm in a straightforward way. Each vector $\vec{v}$ is represented by a quantum state $$|v\rangle = \frac{1}{\|v\|} \Sigma_i v_i |i\rangle.$$

Then the matrices in Equation 7 can be written in terms of expectations and overlaps with respect to quantum states:

$$\hat{M} = \begin{pmatrix} \langle x|A|x\rangle & \langle x|A^2|x\rangle \\ \langle x|A^2|x\rangle & \langle x|A^3|x\rangle \end{pmatrix}, \hat{S} = \begin{pmatrix} 1 & \langle x|A|x\rangle \\ \langle x|A|x\rangle & 1 \end{pmatrix}. \quad (8)$$

The following discussion assumes that the N×N Hermitian operator A satisfies the following:
1. There is a quantum oracle $\mathcal{O}_A$ which allows accessing the matrix elements by the transformation $|i, j, z\rangle \mapsto |i, j, z \oplus A_{ij}\rangle$;
2. At most d non-zero entries on each row or column for some d;
3. The max norm $\|A\|_{max} \leq 1$.

Then there is a method based on quantum walk for effectively applying A onto a state $|v\rangle$ using m=O(logN) ancilla qubits and O(1) queries to $\mathcal{O}_A$, which amounts to performing an operation Q on a general state $|v\rangle$ combined with m ancillas in $|0\rangle$:

$$Q|0^m\rangle|v\rangle = \frac{1}{\|A|v\rangle\|} |0^m\rangle A|v\rangle + |\Phi^\perp\rangle. \quad (9)$$

The general method discussed in Childs, et al. can in fact apply n-th order first-kind Chebyshev polynomial $\mathcal{T}_p(A)$ of the operator A onto a given state $|v\rangle$. One embodiment of the present invention handles the special case n=1 where $\mathcal{T}_p(A) = A$.

Given the ability to apply A to a state, embodiments of the present invention may then use linear combination of unitary (LCU) techniques combined with a variant of oblivious amplitude amplification inspired by fixed-point quantum search to implement the non-unitary operator I+$\alpha$A. Additional details are described below. The outline for the quantum-classical scheme is summarized in Algorithm 5, the pseudo-code for which is as follows:

---

Data: Hermitian positive definite matrix A and upper bound $\gamma$ such that $\|A\|_2 \leq \gamma$;
Result: A state $|v\rangle$ approximating the lowest eigenvector of the matrix A normalized to 1.

-continued

| | |
|---|---|
| 1 | Start from initial state $\|v_0\rangle$ (can be a randomly generated state); |
| 2 | Let $\tilde{A} = \frac{1}{\gamma} A$.<br>Then $\|\tilde{A}\|_{max} \leq \|\tilde{A}\|_2 \leq 1$, satisfying criterion 3 listed previously for using techniques in Childs, et al.; |
| 3 | Let $R_0 = I$ be the first operator in a sequence of operators $R_i$ with each labelling one iteration; |
| 4 | for k = 0, 1, 2, ... do |
| | 5  Prepare copies of the state<br>$\|v_k\rangle = \frac{1}{\|R_k \ldots R_1 R_0 \|v_0\rangle\|} R_k R_{k-1} \ldots R_1 R_0 \|v_0\rangle$<br>where each R_i is a non-unitary operator that can be realized using the procedure described in the section herein entitled, "Realizing the non-unitary operator $I + \alpha \tilde{A}$"; |
| | 6  Estimate $\hat{M}$ and $\hat{S}$ matrices for $\tilde{A}$ using copies of states $\|v_k\rangle$ prepared in the previous step. For details, see the section herein entitled, "Estimating $\hat{M}$ and $\hat{S}$ matrices"; |
| | 7  Solve the eigenvalue problem $\hat{M}\vec{y} = \lambda \hat{S} \vec{y}$ for the lower eigenvector<br>$\vec{y} = \begin{pmatrix} 1 \\ \alpha \end{pmatrix}$; |
| | 8  Let $R_{k+1} = (I + \alpha \tilde{A})$ where $\alpha$ depends on k; |
| 9 | end |
| 10 | Suppose the algorithm terminates at iteration n. Then<br>$\|v_n\rangle = \frac{1}{\|R_n \ldots R_1 R_0 \|v_0\rangle\|} R_n R_{n-1} \ldots R_1 R_0 \|v_0\rangle$<br>is the approximate lowest eigenvector of A (normalized to 1) and<br>$\gamma \langle v\|\tilde{A}\|v\rangle$ is the approximate eigenvalue. |

Another embodiment of the present invention, utilizing Chebyshev polynomials, is summarized in Algorithm 6, the pseudo-code for which is as follows:

| | |
|---|---|
| Data: | Hermitian positive definite matrix A and upper bound $\gamma$ such that $A \leq \gamma I$; A bound $\delta$ which is between the lowest eigenvalue and $\gamma$. |
| Result: | A state $\|v\rangle$ approximating the lowest eigenvector of the matrix A normalized to 1. |
| 1 | Start from initial state $\|v_0\rangle$ (can be a randomly generated state); |
| 2 | Let $\tilde{A} = \frac{1}{\gamma} A$.<br>Then $\|\tilde{A}\|_{max} \leq \|\tilde{A}\|_2 \leq 1$, satisfying criterion 3 listed previously for using techniques in Childs, et al.; |
| 3 | Let $R_0 = I$ be the first operator in a sequence of operators $R_i$ with each labelling one iteration; |
| 4 | Determine the n-th order Chebyshev polynomial of the first type on the interval $[\delta/\gamma, 1]$; |
| 5 | for k = 0, 1, 2, ... do |
| | 6 Prepare copies of the state<br>$\|v_k\rangle = \frac{1}{\|R_k \ldots R_1 R_0 \|v_0\rangle\|} R_k R_{k-1} \ldots R_1 R_0 \|v_0\rangle$<br>where each R_i is a non-unitary operator that can be realized using the procedure described in the section herein entitled, "Realizing the non-unitary operator $I + \alpha A$"; |
| | 7 Let $R_{k+1} = (I + \alpha_k \tilde{A})$ where $1/\alpha_k$ is the k-th zero of the Chebyshev polynomial of the first type on the interval $[\delta/\gamma, 1]$; |
| 8 | end |
| 9 | Then<br>$\|v_n\rangle = \frac{1}{\|R_n \ldots R_1 R_0 \|v_0\rangle\|} R_n R_{n-1} \ldots R_1 R_0 \|v_0\rangle$<br>is the approximate lowest eigenvector of A (normalized to 1) and $\gamma \langle v\|\tilde{A}\|v\rangle$ is the approximate eigenvalue. |

Reducing linear systems to the homogeneous case and eigenvalue problems. An alternative method for solving non-homogenous linear systems is to formulate the problem as a system of homogenous systems. For $A\vec{x} = \vec{b}$, this amounts to solving the system $$(I - \pi_b) A \vec{x} = 0 \quad (10)$$

where $\pi_b$ is the orthogonal projector on the one-dimensional subspace spanned by $\vec{b}$, given by $\pi_b = \vec{b}\vec{b}^\dagger / \mu \vec{b} \mu_2^2$. Note that, technically speaking, the product $(I - \pi_b)A$ is not Hermitian in the entire vector space. However, it is Hermitian and positive definite on the subspace which is the range of the orthogonal projector $(I - \pi_b)$. Hence the methods for Hermitian matrices are applicable as long as the iteration stays within the subspace where the matrix $(I - \pi_b)A$ is Hermitian. The original solution $\vec{x}$ may then be represented as a sum of two orthogonal components: $\vec{x} = \pi_b \vec{x} + (I - \pi_b)\vec{x}$ where the first component can be written as $$\frac{\vec{b}^\dagger \vec{x}}{\|\vec{b}\|_2^2} \vec{b}$$

and the second component is in the range of $(I - \pi_b)$ and can be obtained by the iterative methods described previously.

Alternatively, one may consider the system $$A(I - \pi_b) A \vec{x} = 0 \quad (11)$$

so that the matrix $A(I - \pi_b)A$ is Hermitian positive semi-definite with the null space being one-dimensional subspace spanned by $A^{-1}|b\rangle$.

There are two ways to proceed with numerical solution of the homogeneous Equation (10) and (11): (1) Apply Algorithm 2 herein for the homogeneous case of linear equations; or (2) Apply Algorithm 5 to find the eigenvector corresponding to the smallest eigenvalue of the operator $(I - \pi_b)A$, in which case is zero.

Figure 7:
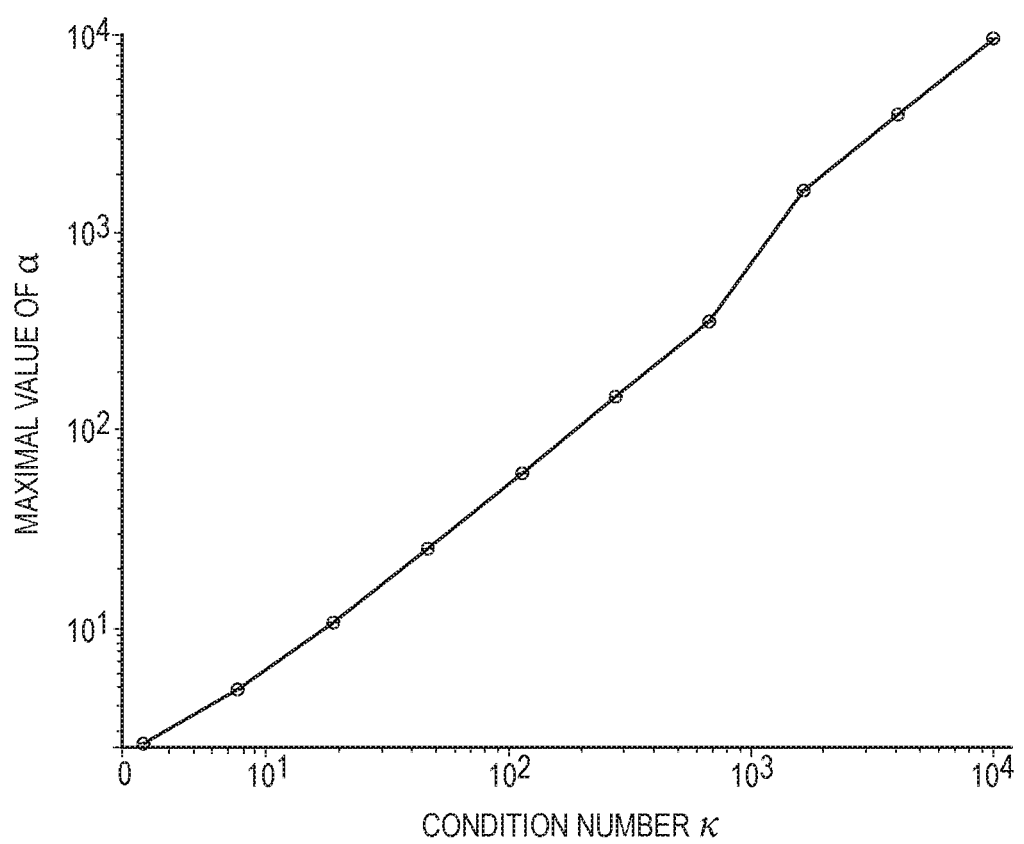
FIG. 7 is a graph showing a maximum value of $\alpha$ as a function of the condition number of a matrix according to one embodiment of the present invention.
Figure 8:
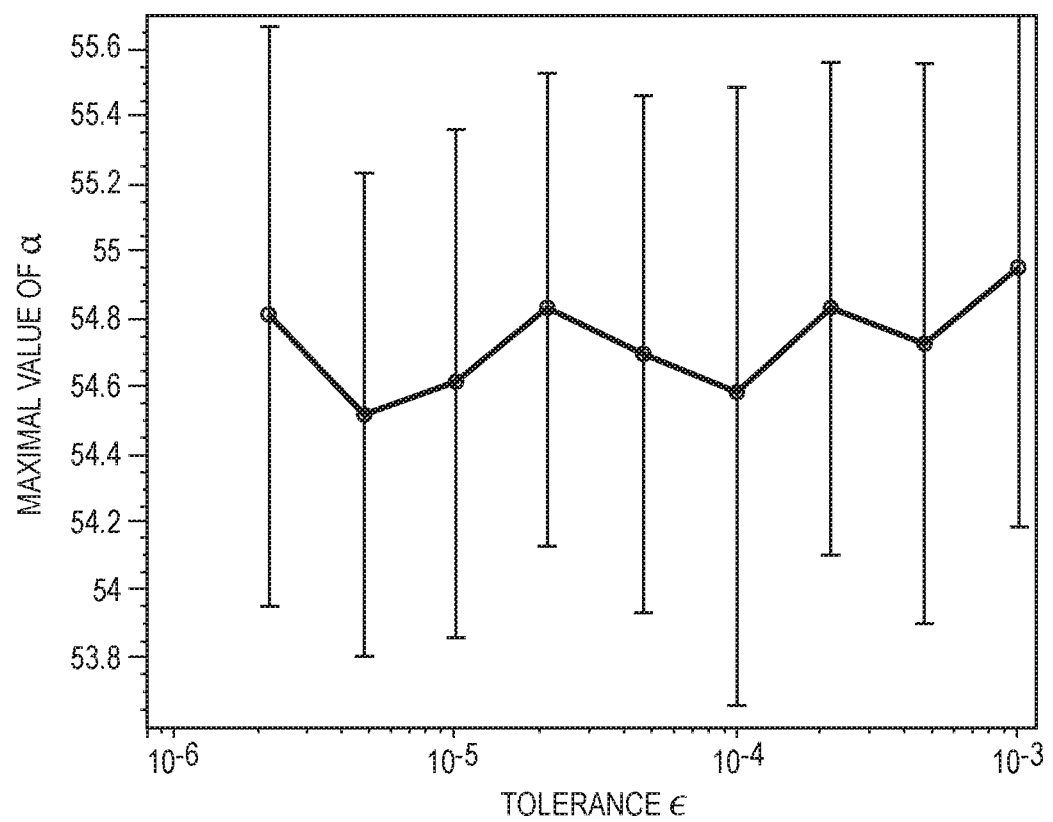
FIG. 8 is a graph showing a maximum value of $\alpha$ as a function of the tolerance $\epsilon$ specified according to one embodiment of the present invention.

Numerical experiments. We set up a simple numerical experiment to obtain empirical scaling of the cost in finding a solution via Algorithm 4 as a function of condition number $\kappa$ and error tolerance $\epsilon$. For simplicity we construct the matrix A as a diagonal matrix whose lowest eigenvalue is $1/\kappa$, with a second lowest eigenvalue being $2/\kappa$ and the rest of the spectrum is evenly spaced in $[2/\kappa, 1]$. The goal of the numerical experiment is to empirically determine the scaling of the following two quantities:
1. Total number of iterations
2. Maximum value of $\alpha$ as the iteration proceeds (see Algorithm 4)

as a function of condition number $\kappa$ and tolerance $\epsilon$. Results indicate that 1. The total number of iterations scales as $$O\left(\sim \log \frac{1}{\epsilon}\right)$$

since the solution error decays exponentially (FIG. 5);
2. The total number of iterations scales as $O(\sim \kappa)$ (FIG. 6);
3. The maximal value of a scales as $O(\sim \kappa)$ (FIG. 7);
4. The maximal value of $\alpha$ is insensitive to $\epsilon$ (FIG. 8).

These empirical scalings will help ascertain the resource scaling of the entire scheme, which will be discussed in the section herein entitled, "Cost Scaling Analysis."

Realizing the non-unitary operator $I+\alpha\tilde{A}$. Previously we mentioned the use of the quantum walk technique, where we have an operator Q (Equation 9 that effectively applies an operation $\tilde{A}$ to an input state $|\rangle$. To implement $I+\alpha\tilde{A}$ for a_given $\alpha>0$ we first use linear combination of unitaries (LCU) techniques to realize the operation $I+\alpha Q$ probabilistically on the combined system of Iv) and the ancilla qubits. This is accomplished by first introducing another ancilla qubit and considering the operator $W=G^\dagger VG$ where $$G = \begin{pmatrix} \frac{1}{\sqrt{1+\alpha}} & -\frac{\sqrt{\alpha}}{\sqrt{1+\alpha}} \\ \frac{\sqrt{\alpha}}{\sqrt{1+\alpha}} & \frac{1}{\sqrt{1+\alpha}} \end{pmatrix} \otimes I \quad (12)$$

is a single-qubit rotation that acts only on the ancilla and $$V=|0\rangle\langle 0|\otimes I+|1\rangle\langle 1|\otimes Q \quad (13)$$

is a controlled unitary with the ancilla qubit as the control. We denote the initial state as $|\psi\rangle=|0\rangle|0^m\rangle|v\rangle$ and the desired state as $$|\Phi\rangle = \frac{1}{\|(I+\alpha\tilde{A})|v\rangle\|}|0\rangle|0^m\rangle(I+\alpha ldeA)|v\rangle.$$

Then we have $$W|\Psi\rangle = \frac{\|(I+\alpha\tilde{A})|v\rangle\|}{1+\alpha}|\Phi\rangle + \sqrt{1 - \frac{\|(I+\alpha\tilde{A})|v\rangle\|^2}{(1+\alpha)^2}}|\Phi^\perp\rangle \quad (14)$$

for some state $|\Phi^\perp\rangle$ orthogonal to $|\Phi\rangle$. In particular, $(\langle 0^{m+1}|\otimes I)|\Phi^\perp\rangle=0$. A successful implementation of $I+\alpha A$ is conditioned on measuring $|0\rangle$ in the m+1 ancilla qubits. This has probability $$p = \frac{\|(I+\alpha\tilde{A})|v\rangle\|^2}{(1+\alpha)^2},$$

which can be low for large $\alpha$ values.

The success probability can be boosted by oblivious amplitude amplification, which is analogous to standard amplitude amplification techniques derived from Grover's search algorithm. One could also adopt more optimized approach incorporating advantageous properties of fixed-point quantum search, forming a fixed-point oblivious amplitude amplification approach. We leave out the details here but instead simply state that for an initial success probability $p=1-\delta_0$, it costs $$O\left(\frac{\log\delta^{-1}}{\log\delta_0^{-1}}\right)$$

calls to W to boost the success probability to $1-\delta$.

Imaginary time evolution. We can use the ability to implement operators of the form $I+\alpha H$ for scalar $\alpha$ and Hermitian operator H to perform imaginary time evolution $e^{-tH}$. In particular, we use the approximation $$e^{-tH} = \left(I - \frac{t}{r}H\right)^r + O(1/r) \quad (15)$$

for approximating the imaginary-time evolution. This leads to $r=O(1/\epsilon)$ for error $\epsilon$. This corresponds to a simple case where we apply the same non-unitary operators of the form $I+\alpha H$. We can shorten this sequence into length $$O\left(\log\frac{1}{\epsilon}\right)$$

with locally optimal iterations. However, finding such sequence costs $$\text{poly}\left(\frac{1}{\epsilon}\right).$$

Estimating $\hat{M}$ and $\hat{S}$ matrices. The matrices $\hat{M}$ and $\hat{S}$ in Equation 8 essentially requires estimating expectations of $\tilde{A}$, $\tilde{A}^2$ and $\tilde{A}^3$ with respect to a state $|x\rangle$ which can be prepared on a quantum computer. There are multiple ways for performing such estimations. For example if $\tilde{A}$ admits a decomposition $\tilde{A}=\sum_{i=1}^\ell \mu_i \tilde{A}_i$ of terms directly measurable on a quantum computer then we can glean all of the expectation values by explicitly writing down the decomposition of $\tilde{A}^2$ and $\tilde{A}^3$ as a linear combination of $\tilde{A}_i$ operators. This requires in total $O(\ell^3)$ measurements which may be costly in practice. An alternative method can be the following:

Estimate $\langle x|\tilde{A}|x\rangle$. This can be done by the explicit decomposition of $\tilde{A}$ as in the setting for VQE;

Prepare the state $$\frac{\tilde{A}|x\rangle}{\|\tilde{A}|x\rangle\|}$$

by the quantum walk method mentioned in the section herein entitled, "Iterative scheme for eigenvalue problems."

Measure its overlap with $|x\rangle$ via SWAP test gives $$\frac{|\langle x|\tilde{A}|x\rangle|^2}{\langle x|\tilde{A}^2|x\rangle}.$$

From this we can get $\langle x|\tilde{A}^2|x\rangle$ using the previously obtained $\langle x|\tilde{A}|x\rangle$ value;

Measuring $\tilde{A}$ with respect to the state $$\frac{\tilde{A}|x\rangle}{\|\tilde{A}|x\rangle\|}$$

gives $$\frac{\langle x|\tilde{A}^3|x\rangle}{\langle x|\tilde{A}^2|x\rangle}.$$

Using the $\langle x|\tilde{A}^2|x\rangle$ computed from the previous step we can evaluate $\langle x|\tilde{A}^3|x\rangle$.

The advantage of this scheme is that as opposed to $O(\ell^3)$ measurements, we only need $O(\ell)$ measurements for evaluating all three expectations. This is asymptotically comparable to VQE.

Figure 5:
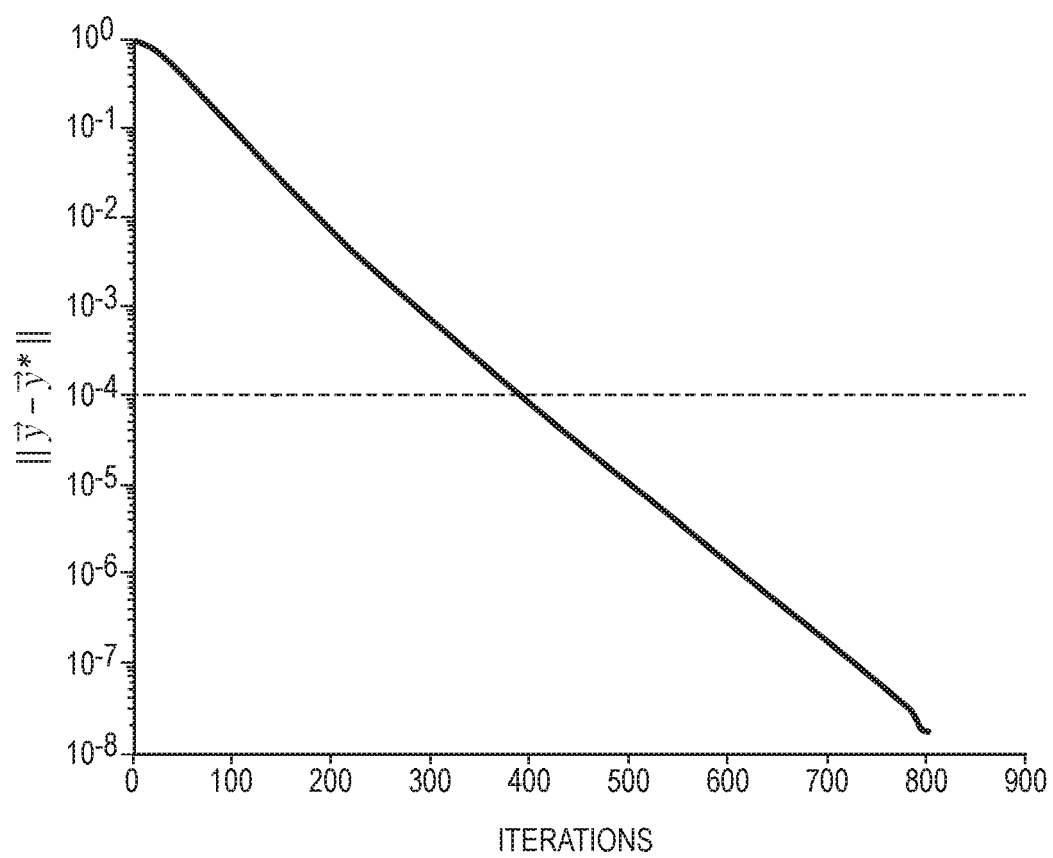
FIG. 5 is a graph showing scaling of solution error as a function of iterations according to one embodiment of the present invention.
Figure 6:
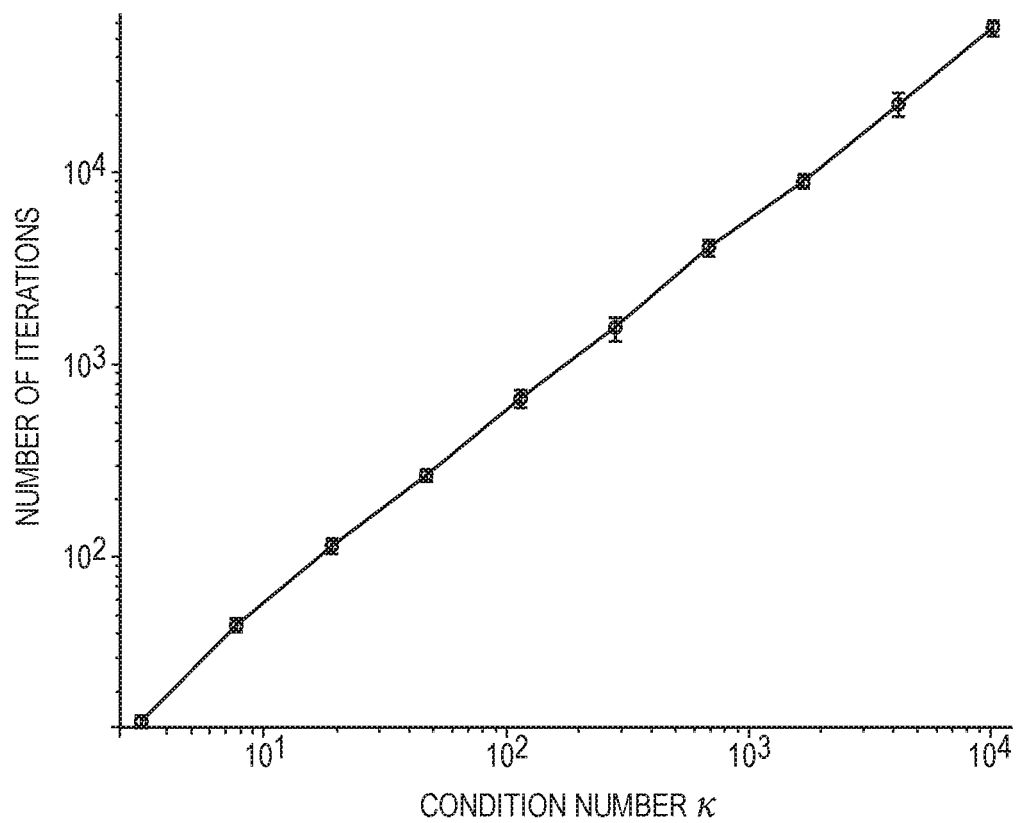
FIG. 6 is a graph showing a number of iterations needed to reach solution error below a fixed threshold as a function of the condition number of the matrix according to one embodiment of the present invention.

Cost scaling analysis. To estimate the cost of the entire scheme as a function of condition number $\kappa$ and error tolerance $\epsilon$, we might first estimate the number n of iterations and the cost $C_k$ of each iteration k. The total cost of the scheme, as it is formulated in Algorithm 5, is then $\Sigma_{k=1}^n C_k$. The empirical scaling of n is observed to be $$n = O\left(\sim \kappa \log \frac{1}{\epsilon}\right) \quad (16)$$

from FIGS. 5 and 6. It then remains to estimate the cost $C_k$ during each iteration (Algorithm 5).

In the section herein entitled, "Realizing the non-unitary operator $I+\alpha\tilde{A}$," we mentioned that it takes $$O\left(\frac{\log \delta^{-1}}{\log \delta_0^{-1}}\right)$$

times to implement $R_k$ with success probability at least 1-$\delta$ and initial success probability $$p = \frac{\|(I+\alpha\tilde{A})|v\rangle\|^2}{(1+\alpha)^2} = 1 - \delta_0.$$

We note that if we expand $|v\rangle$ in the eigenbasis of $\tilde{A}$ as $|v\rangle = \Sigma_k \beta_k |u_k\rangle$, where $\Sigma_k |\beta_k|^2 = 1$, then $$\|(I+\alpha\tilde{A})|v\rangle\|^2 = \left\|\sum_k (1+\alpha\lambda_k)\beta_k |u_k\rangle\right\|^2 \geq (1+\alpha\lambda_{min})^2 \sum_k |\beta_k|^2 \quad (17)$$
$$= (1+\alpha\lambda_{min})^2$$

where $\lambda_{min=O(1/\kappa)}$ is the smallest eigenvalue of $\tilde{A}$. Since $\alpha = O(\sim \kappa)$ in FIG. 7. The Rayleigh quotient, defined for the original unscaled matrix A by $$\rho(\vec{x}) = \frac{\vec{x}^\dagger A \vec{x}}{\vec{x}^\dagger \vec{x}},$$

takes its smallest value on the vector $\vec{x}_{k+1} = \vec{x}_k + \alpha A \vec{x}_k$ within the two-dimensional subspace spanned by the vectors $\vec{x}_k$ and $A\vec{x}_k$, by construction of the step size $\alpha$ in the steepest descent Algorithm 4. Applying similar argument to those cited above, we claim that in the formula $\vec{x}_{k+1} = \vec{x}_k + \alpha A \vec{x}_k$ in Algorithm 4, the value $-1/\alpha$ is the maximum of the Rayleigh quotient on the two-dimensional subspace spanned by the vectors $\vec{x}_k$ and $A\vec{x}_k$, which by the Courant min-max principle implies the bounds $-1/\alpha \in [\lambda_{min+1}, \lambda_{max}]$ in terms of the eigenvalues of the original unscaled matrix A.

Algorithm 5 is applied to the scaled matrix $\tilde{A}$, while using the same notation $\alpha$ for the step size, so now $-1/\alpha \in [\lambda_{min+1,1}]$, where $\lambda_{min+1}$ is the second smallest eigenvalue of the scaled matrix $\tilde{A}$.

We conclude that $\alpha \lambda_{min=O(\sim 1)}$. Hence the term $\|(I+\alpha\tilde{A})|v\rangle\|^2$) is bounded from below by a constant. Therefore $$p = O\left(\sim \frac{1}{(1+\kappa^2)}\right) \text{ and } \delta_0 = O\left(\sim 1 - \frac{1}{\kappa^2}\right).$$

The total cost of implementing $R_k$ with success probability at least 1-$\delta$ is then $$O\left(\sim \kappa^2 \log \frac{1}{\delta}\right).$$

For a total of n iterations, the success probability of implementing the entire sequence of $R_k$ operators is then $(1-t\alpha)^n = 1 - n\delta + O(\delta^2)$. To ensure constant success probability of the entire sequence we let $\delta = O(1/n)$.

Another cost that is implicit in the implementation of $R_k$ is the estimation of matrices $\hat{M}$ and $\hat{S}$. This costs $O(\epsilon^{-2})$ repetitions in preparing the state $|v_k\rangle$ (Algorithm 5). To prepare $|v_k\rangle$ requires realizing all of the operators $R_1$ through $R_k$, which costs in total $O(\sim k \cdot \kappa^2 \log n)$ from previous arguments. Therefore we have the total cost of each iteration k as $$C_k = O\left(\sim \frac{\kappa^2}{\epsilon^2} k \log n\right).$$

The total cost of the entire Algorithm 5 is then estimated as $C_1 + \ldots + C_n$ which scales as $$O\left(\sim \frac{\kappa^4}{\epsilon^2} \log^2 \frac{1}{\epsilon} \log\left(\kappa \log \frac{1}{\epsilon}\right)\right) \text{ or } \tilde{O}\left(\sim \frac{\kappa^4}{\epsilon^2}\right). \quad (18)$$

After the iterations have terminated, the cost of preparing the lowest eigenstate is then the cost of implementing $R_1$ through $R_n$, which amounts to $O(\sim n\kappa^2 \log n)$. In terms of $\kappa$ and $\epsilon$ this becomes $$O\left(\sim \kappa^3 \log \frac{1}{\epsilon} \log\left(\kappa \log \frac{1}{\epsilon}\right)\right) \text{ or } \tilde{O}(\sim \kappa^3). \quad (19)$$

The cost of estimating the lowest eigenvalue up to error $\epsilon$ by direct measurement is then $$O\left(\frac{1}{\epsilon^2} \cdot n\kappa^2 \log n\right)$$

or $\tilde{O}(\sim \kappa^3/\epsilon^2)$.

Figure 4:
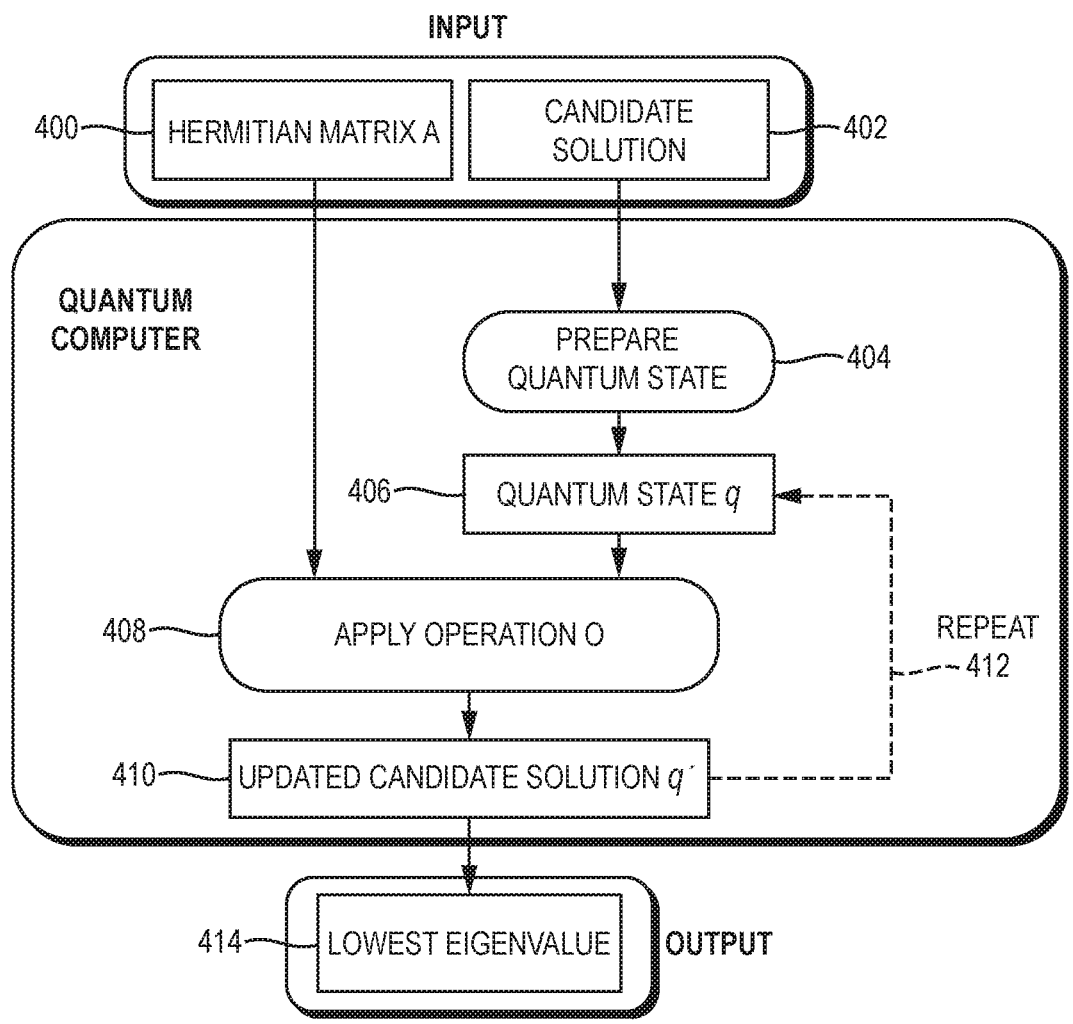
FIG. 4 is a dataflow diagram of a method performed by one embodiment of the present invention to solve systems of equations and eigenvalue problems utilizing non-unitary transformations on a quantum computing component.

Referring to FIG. 4, a dataflow diagram is shown of a method performed by one embodiment of the present invention to use a quantum computer (also referred to herein as a quantum computing component) to solve systems of equations and eigenvalue problems utilizing non-unitary transformations.

The quantum computing component of FIG. 4 may, for example, be any kind of quantum computer disclosed herein, and may include a plurality of qubits. The quantum computing component may be adapted to find the lowest eigenvector of a Hermitian matrix A 400 by repeatedly updating a candidate solution 402, by: (A) preparing, on the quantum computing component, a quantum state q 406 encoding the candidate solution 402 (operation 404), (B) applying, on the quantum computing component, an operation O, which depends on the Hermitian matrix A 400, to the quantum state q 406 to obtain an updated candidate solution q' 410 (operation 408), (C) repeating step (B), wherein the operation is applied to the updated candidate solution q' 410, until a final quantum state has been obtained (operation 412), and (D) measuring, on the quantum computing component, the final state to obtain the lowest eigenvector of A (operation 414).

The system of FIG. 4 may further include a classical computing component, which may include at least one processor and at least one non-transitory computer-readable medium having computer program instructions stored thereon. The computer program instructions may be executable by the at least one processor to perform an operation of: (E) before (A), computing the operation O (e.g., generating data and/or instructions representing the operation O). The computer program instructions may be executable by the at least one processor to perform an operation of: (E) before (A), generating the candidate solution 402.

The operation O may be equal to I+bA, for some constant b. The operation O may be equal to a Chebyshev polynomial of A. The final quantum state may be measured to obtain the lowest eigenvalue of A.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2n×2n complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state.

Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
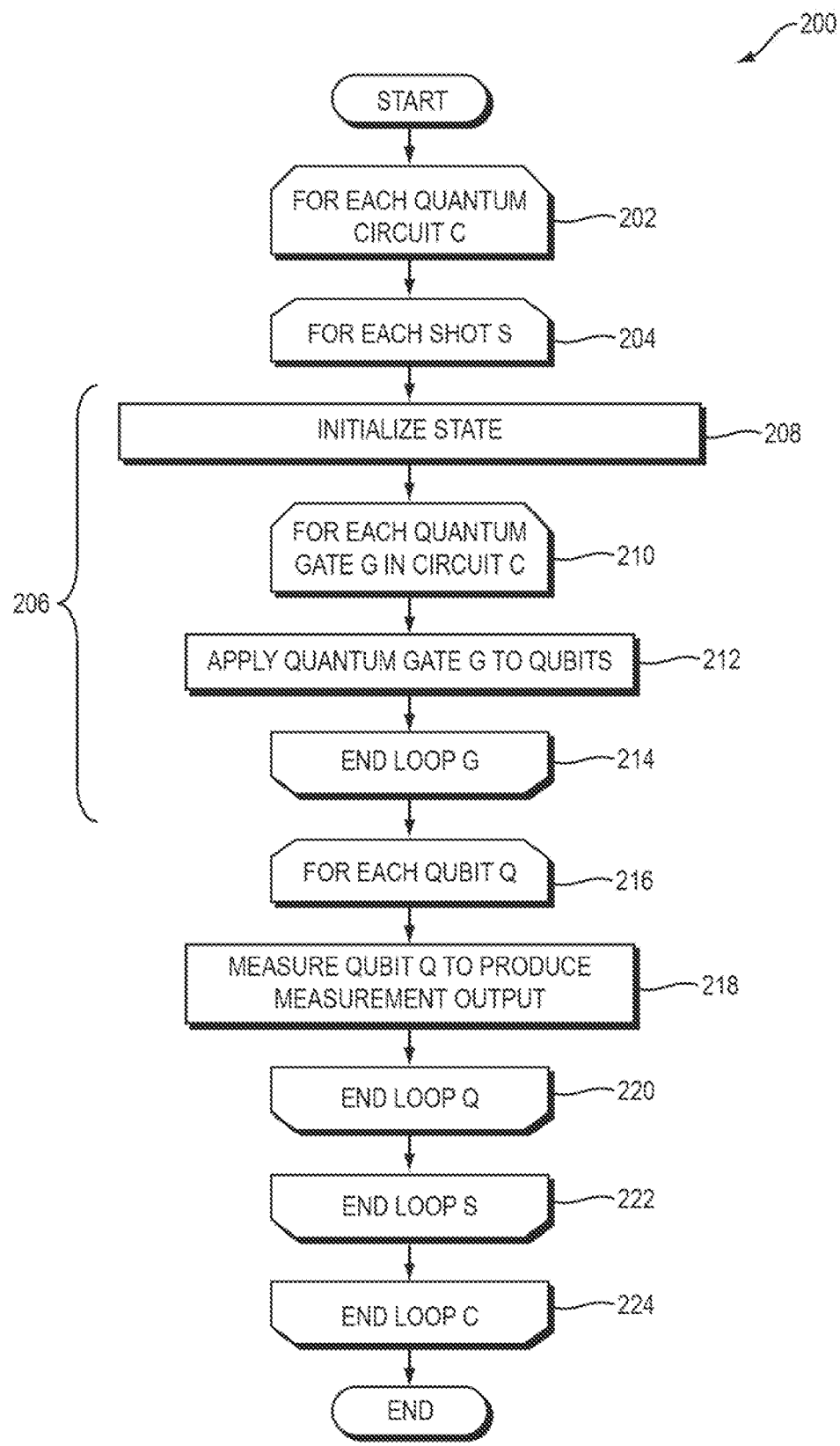
FIG. 2A is a flowchart of a method performed by the quantum computer of FIG. 1 according to one embodiment of the present invention.
Figure 2B:
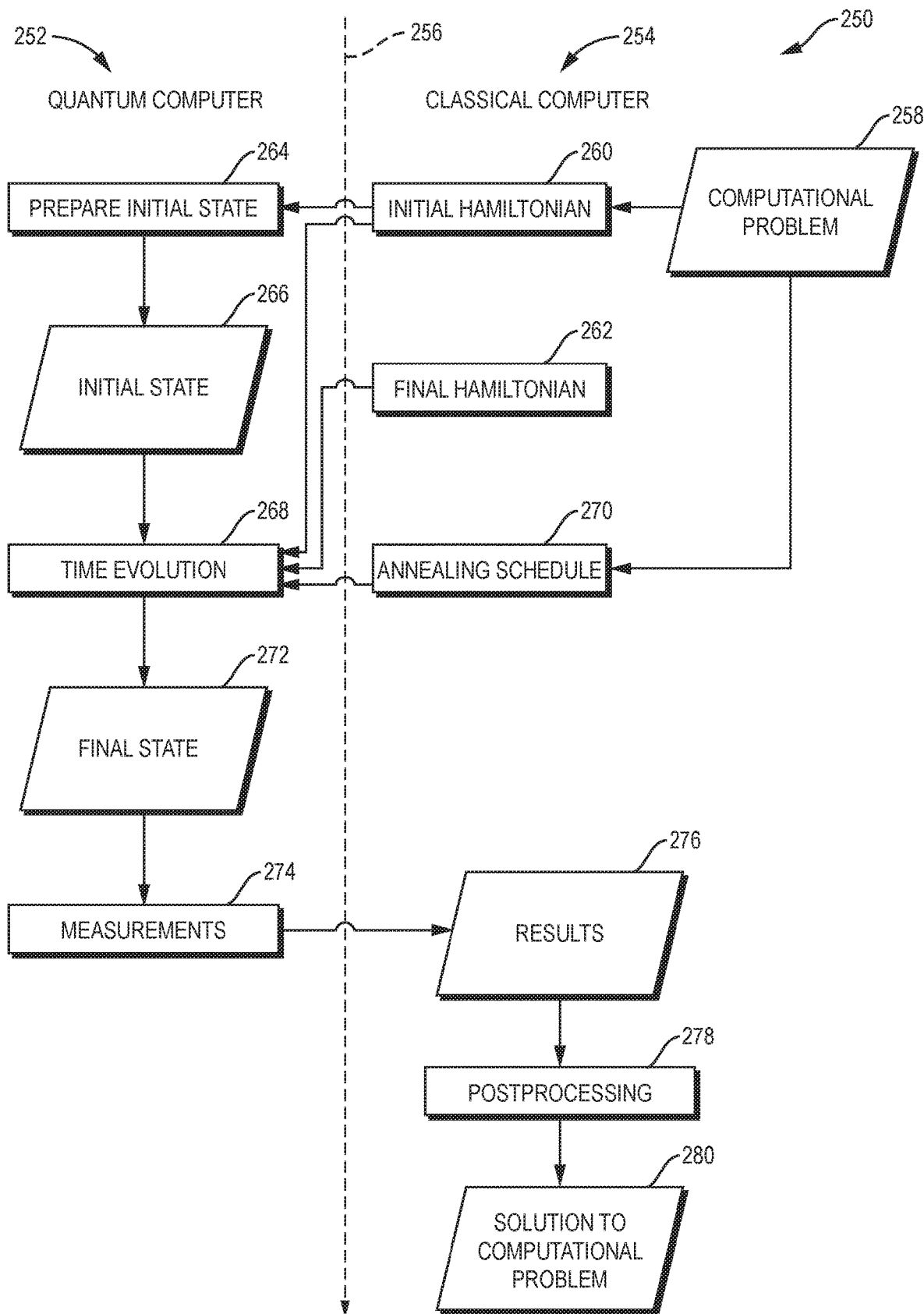
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrodinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original computational problem 258. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signals 114 from the measurement unit 110 to the control unit 106. Such feedback signals 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e., the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A-2B as elements of "state preparation" may instead be characterized as elements of gate application. Conversely, for example, some or all of the components and operations that are illustrated in FIGS. 1 and 2A-2B as elements of "gate application" may instead be characterized as elements of state preparation. As one particular example, the system and method of FIGS. 1 and 2A-2B may be characterized as solely performing state preparation followed by measurement, without any gate application, where the elements that are described herein as being part of gate application are instead considered to be part of state preparation. Conversely, for example, the system and method of FIGS. 1 and 2A-2B may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
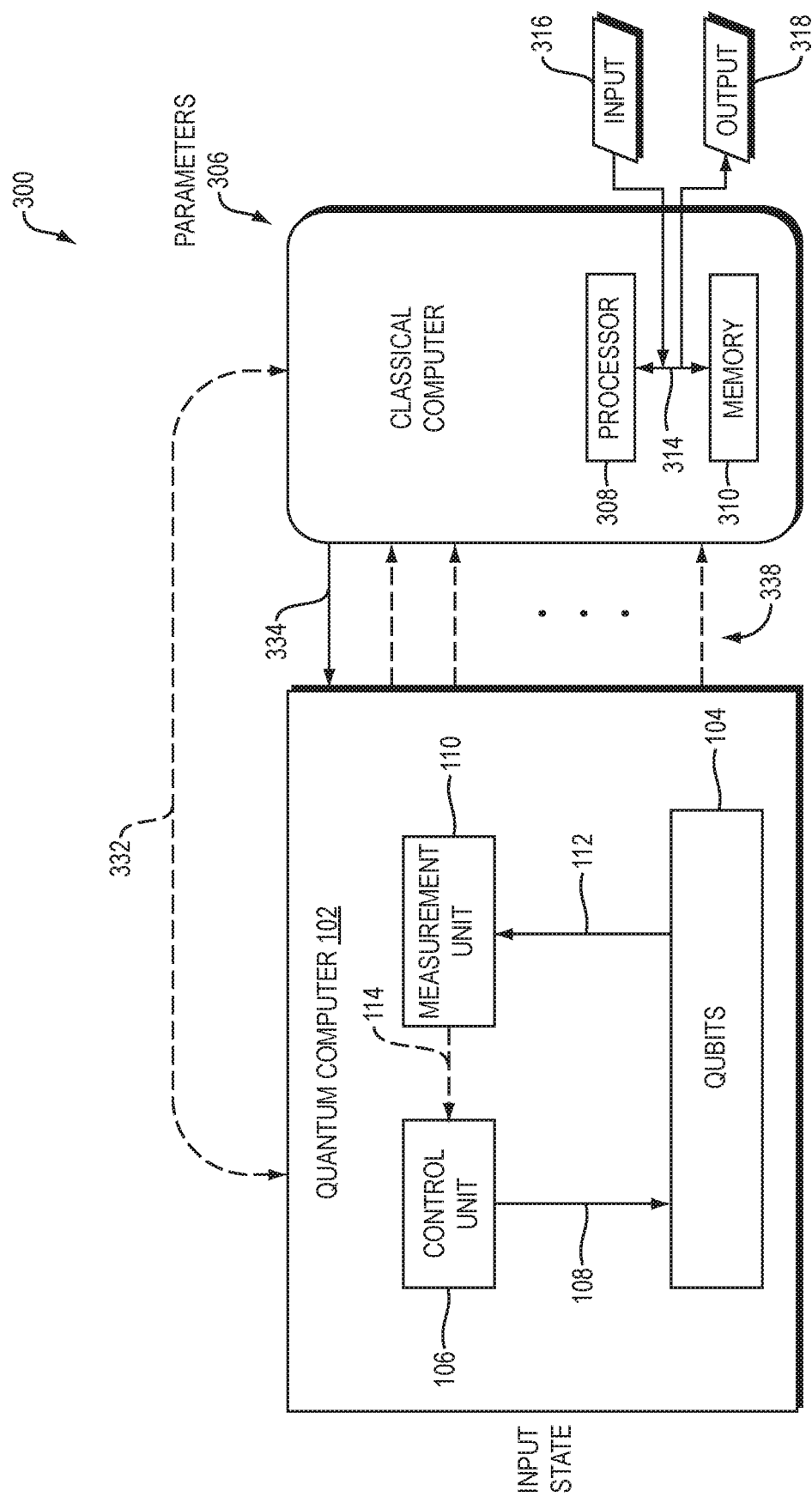
FIG. 3 is a diagram of a hybrid quantum-classical computer according to one embodiment of the present invention.

Referring to FIG. 3, a diagram is shown of a hybrid quantum-classical (HQC) computer 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals Y32 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals Y34 to the quantum computer 102, in response to which the quantum computer 102 may apply the gate operations specified by the control signals Y32 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output Y38 representing the collapse of the states of the qubits 104 into one of their eigenstates. As a result, the measurement output Y38 includes or consists of bits and therefore represents a classical state. The quantum computer 102 provides the measurement output Y38 to the classical processor 308. The classical processor 308 may store data representing the measurement output Y38 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may solve systems of equations and eigenvalue problems by performing millions or billions of computations. Such computations could not be performed manually or mentally on problems of realistic scale.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

What is claimed is:

1. A method for using a quantum computing component to find the lowest eigenvector of a Hermitian matrix A by repeatedly updating a candidate solution, the method comprising:
   (A) preparing, on the quantum computing component, a quantum state q encoding the candidate solution,
   (B) applying, on the quantum computing component, an operation O, which depends on the Hermitian matrix A, to the quantum state q to obtain an updated candidate solution q',
   (C) repeating step (B), wherein the operation is applied to the updated candidate solution q', until a final quantum state has been obtained, and
   (D) measuring, on the quantum computing component, the final quantum state to obtain the lowest eigenvector of A.

2. The method of claim 1, further comprising:
   (E) before (A), computing, on a classical computing component, the operation O.

3. The method of claim 1, further comprising:
   (E) before (A), generating, on the classical computing component, the candidate solution.

4. The method of claim 1, wherein the operation O is equal to I+bA, for some constant b.

5. The method of claim 1, wherein the operation O is equal to a Chebyshev polynomial of A.

6. The method of claim 1, further comprising measuring the final quantum state to obtain the lowest eigenvalue of A.

7. A computing system comprising:
   a quantum computing component comprising a plurality of qubits; and
   wherein the quantum computing component is adapted to find the lowest eigenvector of a Hermitian matrix A by repeatedly updating a candidate solution, by:
   (A) preparing, on the quantum computing component, a quantum state q encoding the candidate solution,
   (B) applying, on the quantum computing component, an operation O, which depends on the Hermitian matrix A, to the quantum state q to obtain an updated candidate solution q',
   (C) repeating step (B), wherein the operation is applied to the updated candidate solution q', until a final quantum state has been obtained, and
   (D) measuring, on the quantum computing component, the final quantum state to obtain the lowest eigenvector of A.

8. The computing system of claim 7, further comprising:
   a classical computing component comprising at least one processor and at least one non-transitory computer-readable medium having computer program instructions stored thereon, the computer program instructions being executable by the at least one processor to perform an operation of:
   (E) before (A), computing the operation O.

9. The computing system of claim 7, further comprising:
   a classical computing component comprising at least one processor and at least one non-transitory computer-readable medium having computer program instructions stored thereon, the computer program instructions being executable by the at least one processor to perform an operation of:

(E) before (A), generating the candidate solution.

10. The computing system of claim 7, wherein the operation O is equal to I+bA, for some constant b.

11. The computing system of claim 7, wherein the operation O is equal to a Chebyshev polynomial of A.

12. The computing system of claim 7, wherein the quantum computing component is further adapted to measure the final quantum state o obtain the lowest eigenvalue of A.

* * * * *